(12) United States Patent
Kim et al.

(10) Patent No.: US 11,513,662 B2
(45) Date of Patent: Nov. 29, 2022

(54) METHOD FOR OUTPUTTING COMMAND METHOD

(71) Applicants: Hyo June Kim, Yongin-si (KR); Ji Hye Seo, Yongin-si (KR); Hye In Kim, Yongin-si (KR); Ye In Kim, Yongin-si (KR)

(72) Inventors: Hyo June Kim, Yongin-si (KR); Ji Hye Seo, Yongin-si (KR); Hye In Kim, Yongin-si (KR); Ye In Kim, Yongin-si (KR)

(*) Notice: Subject to any disclaimer, the term of this patent is extended or adjusted under 35 U.S.C. 154(b) by 0 days.

(21) Appl. No.: 17/602,978

(22) PCT Filed: Mar. 20, 2020

(86) PCT No.: PCT/KR2020/003877
§ 371 (c)(1),
(2) Date: Oct. 11, 2021

(87) PCT Pub. No.: WO2020/209520
PCT Pub. Date: Oct. 15, 2020

(65) Prior Publication Data
US 2022/0113848 A1     Apr. 14, 2022

(30) Foreign Application Priority Data

Apr. 9, 2019  (KR) .......... 10-2019-0041341
Jul. 10, 2019  (KR) .......... 10-2019-0083089

(51) Int. Cl.
*G06F 3/0482*   (2013.01)
*G06V 40/12*   (2022.01)
*G06F 3/04845*  (2022.01)
*G06F 3/04883*  (2022.01)
*G06F 21/32*   (2013.01)

(52) U.S. Cl.
CPC ........ *G06F 3/0482* (2013.01); *G06F 3/04845* (2013.01); *G06F 3/04883* (2013.01); *G06F 21/32* (2013.01); *G06V 40/1365* (2022.01)

(58) Field of Classification Search
CPC .............. G06F 3/0482; G06F 3/04845; G06F 3/04883; G06F 21/32; G06F 3/017; G06F 3/04886; G06F 3/0481; G06F 3/167; G06F 21/31; G06V 40/1365
See application file for complete search history.

(56) References Cited

U.S. PATENT DOCUMENTS

| | | | |
|---|---|---|---|
| 2009/0183100 A1 | 7/2009 | Eom et al. | |
| 2014/0157200 A1 | 6/2014 | Jeon | |
| 2016/0092098 A1 | 3/2016 | Kim et al. | |
| 2017/0097751 A1* | 4/2017 | Lee | G06F 3/04812 |
| 2018/0284892 A1* | 10/2018 | Kwon | G06F 3/0416 |

FOREIGN PATENT DOCUMENTS

| | | |
|---|---|---|
| JP | 2006-139615 A | 6/2006 |
| KR | 10-2009-0077597 A | 7/2009 |
| KR | 10-2014-0072731 A | 6/2014 |
| KR | 10-1529886 B1 | 6/2015 |
| KR | 10-2016-0038413 A | 4/2016 |

\* cited by examiner

*Primary Examiner* — Maryam M Ipakchi
(74) *Attorney, Agent, or Firm* — Maschoff Brennan

(57) ABSTRACT

Disclosed is an invention relating to a processor-executed method for outputting a hierarchical command menu on a display depending on user inputs.

12 Claims, 10 Drawing Sheets

[FIG. 1]
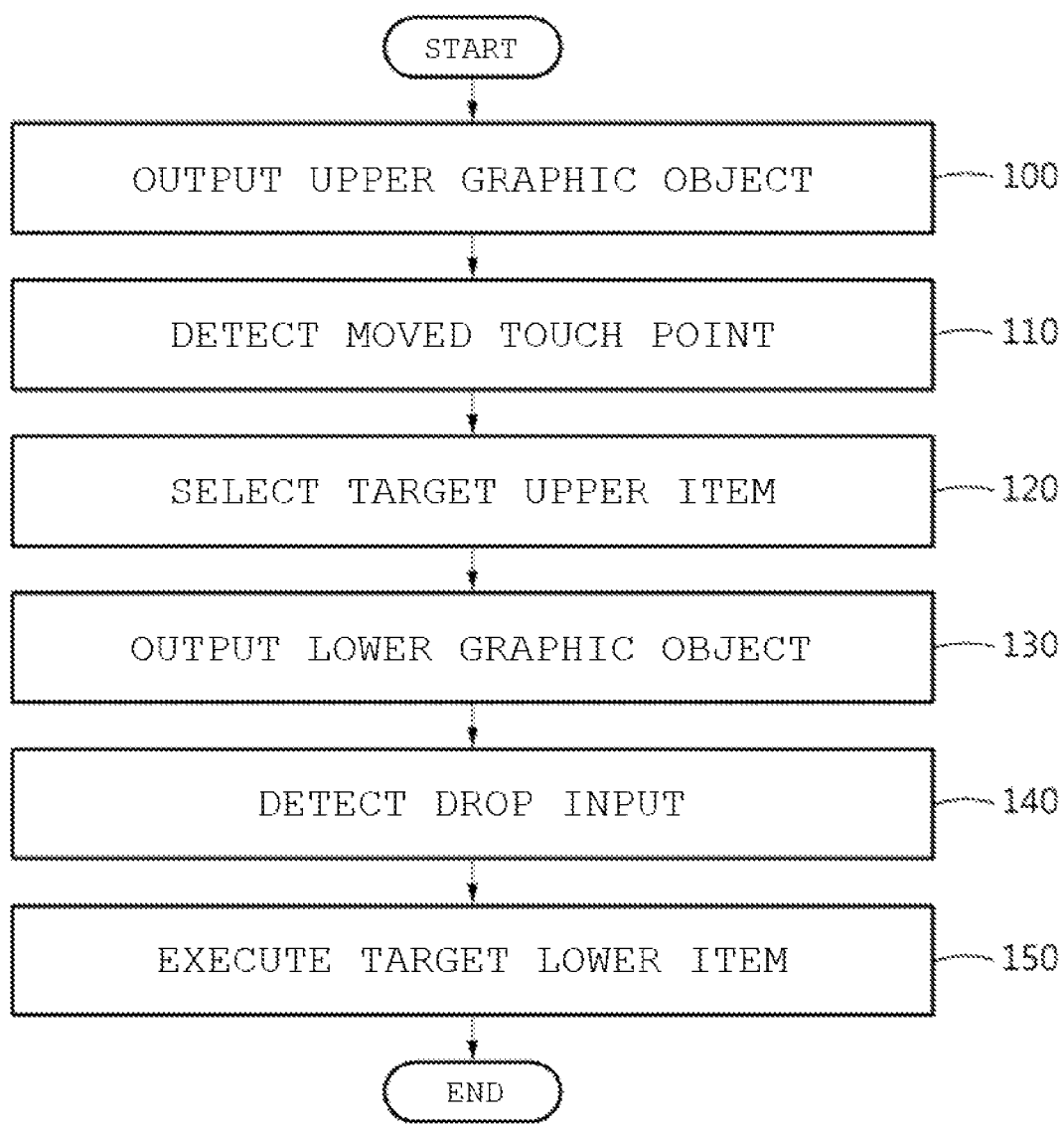

[FIG. 2]
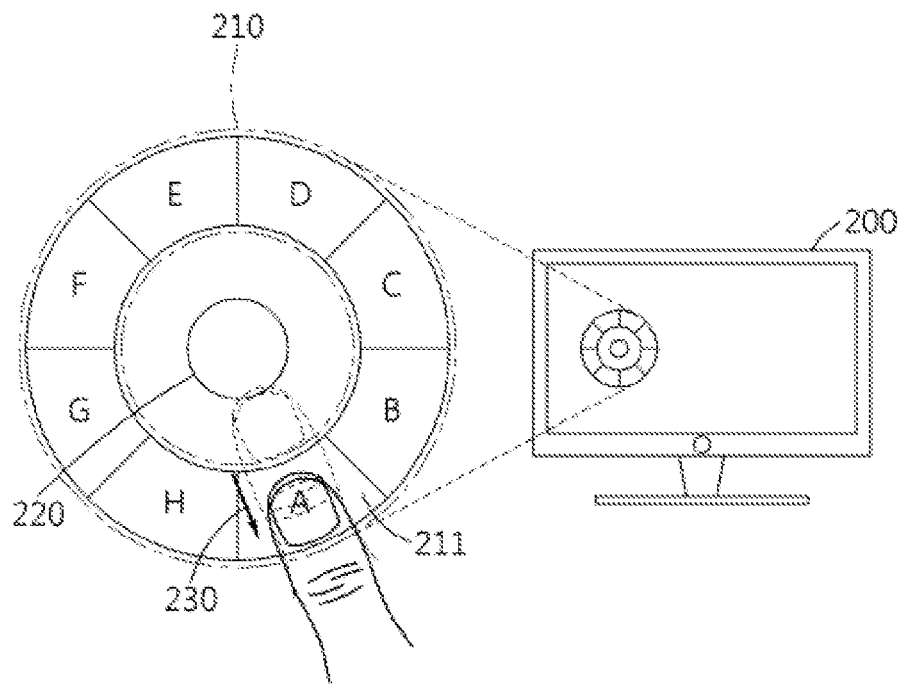
[FIG. 3]
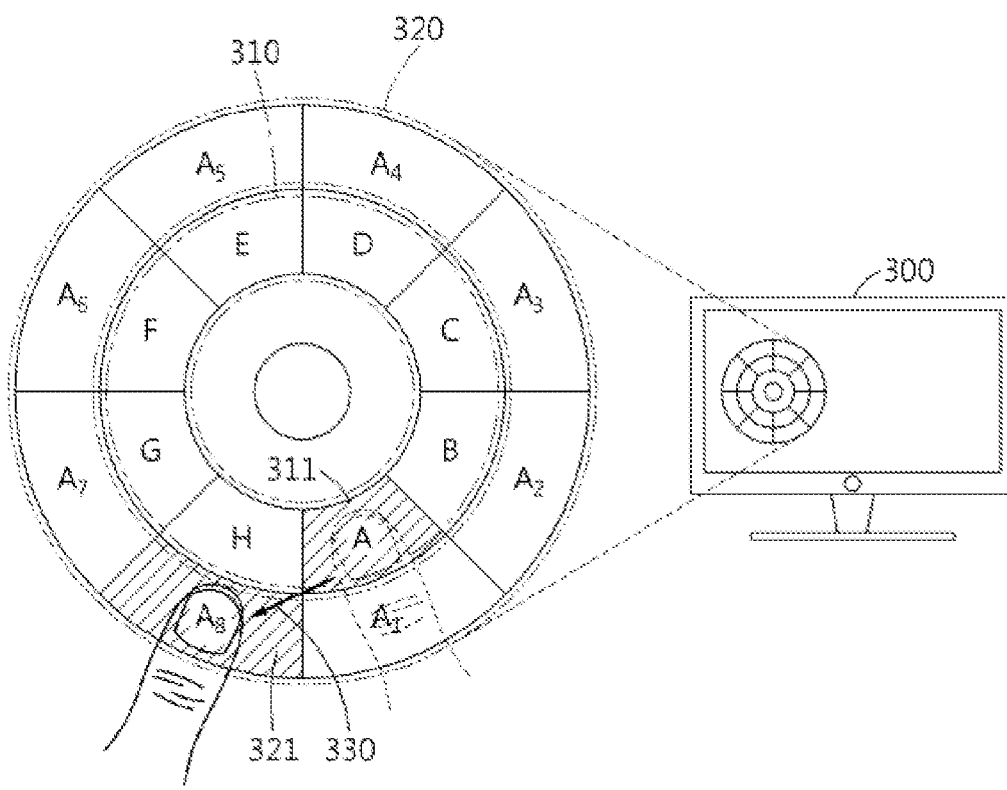

[FIG. 4]
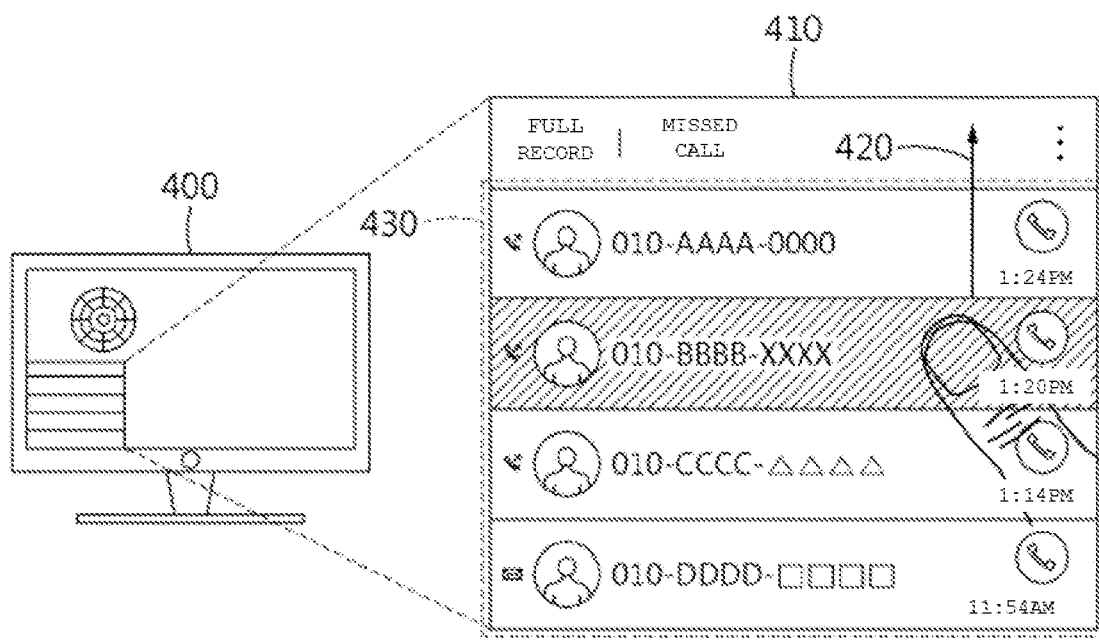

[FIG. 5]
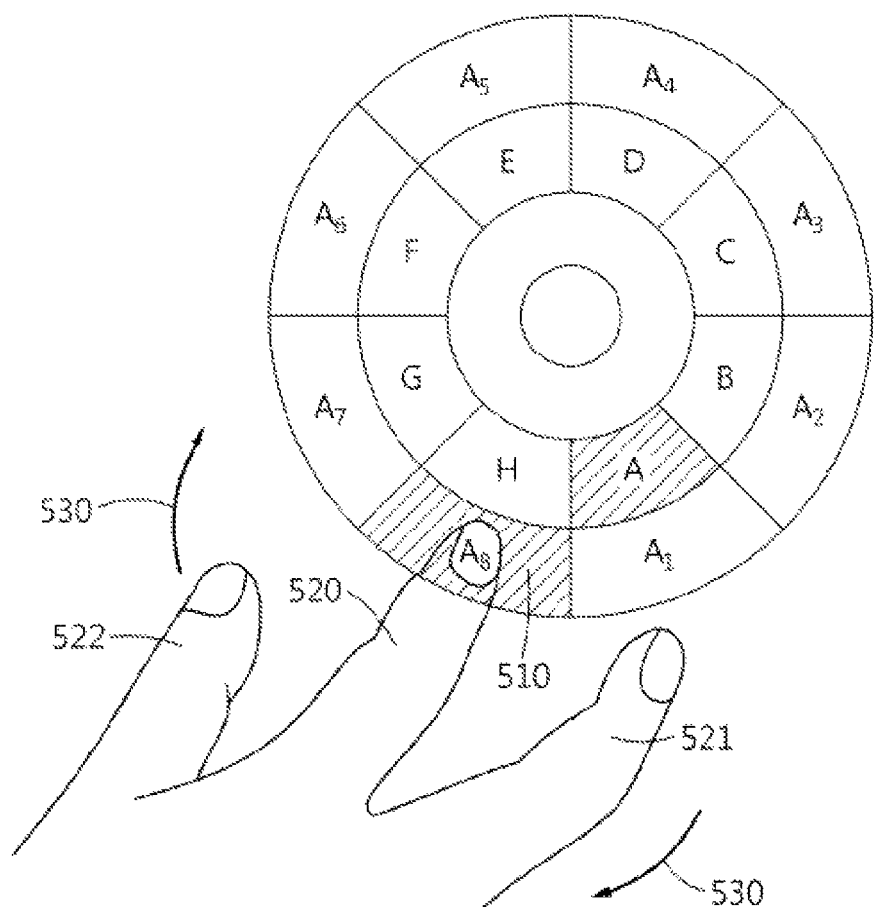

[FIG. 6]
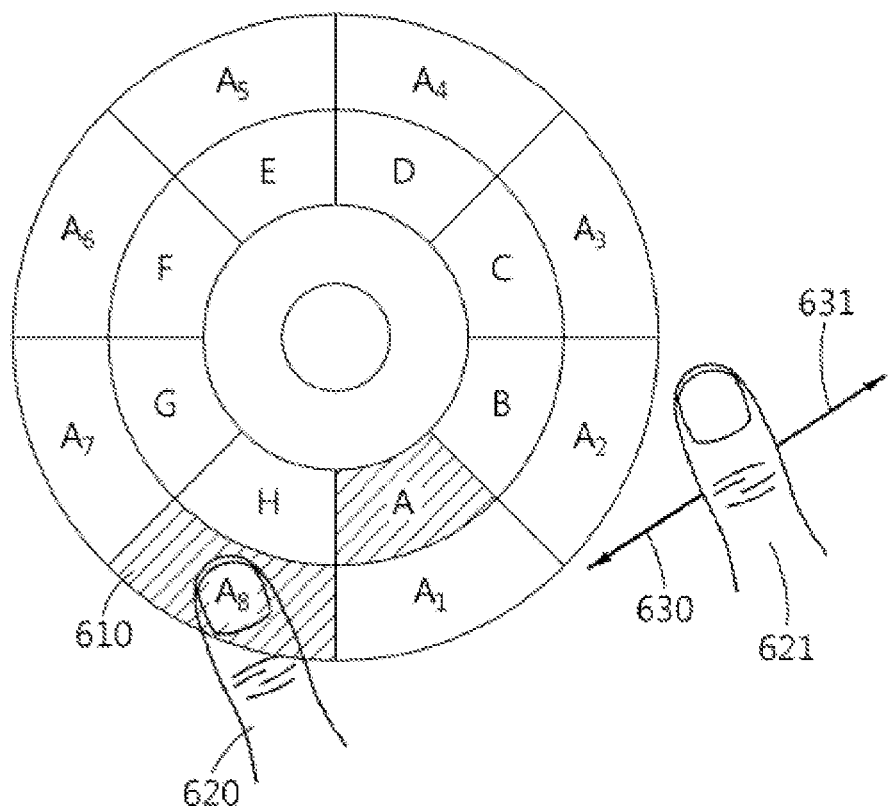

[FIG. 7]
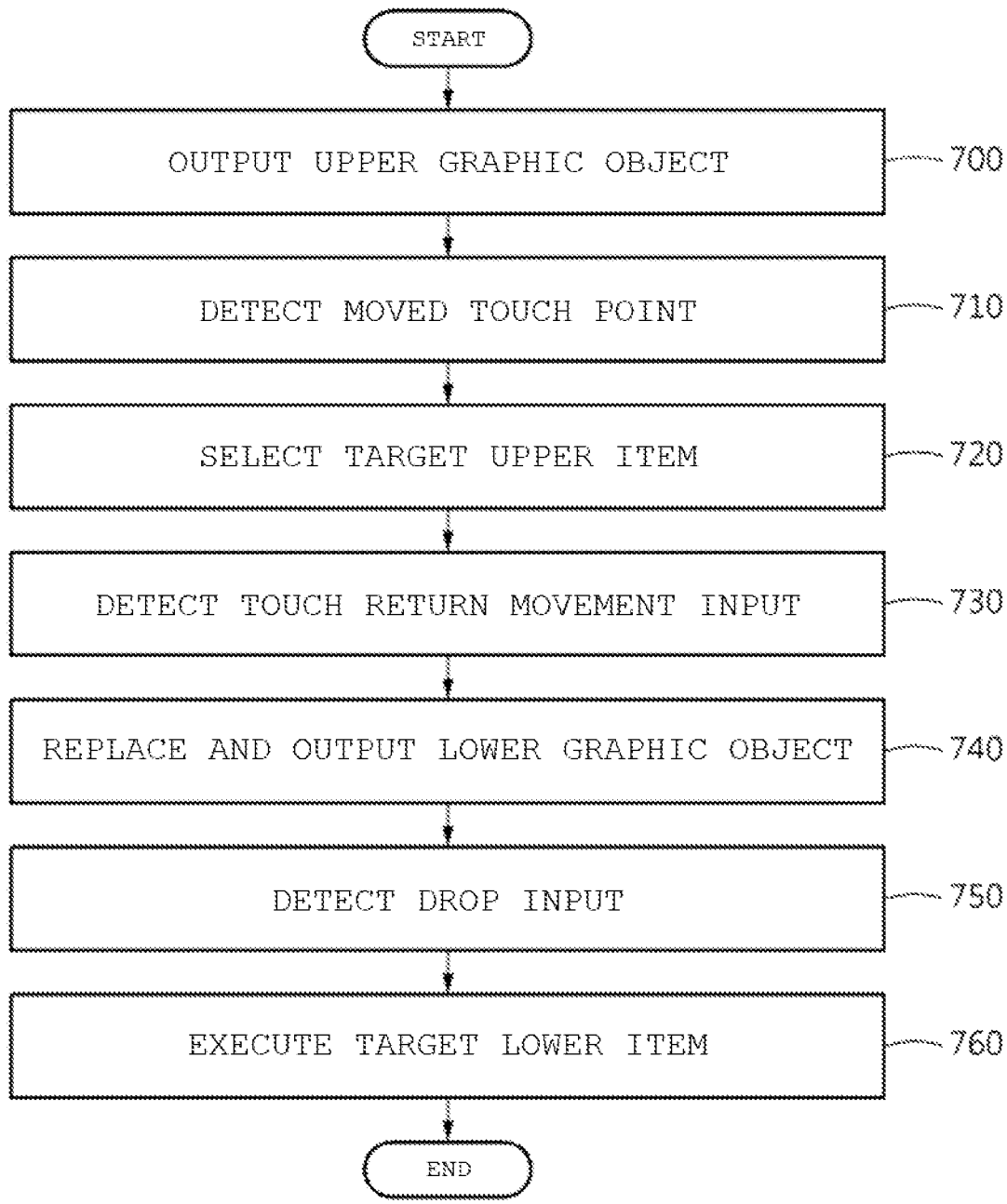

[FIG. 8]
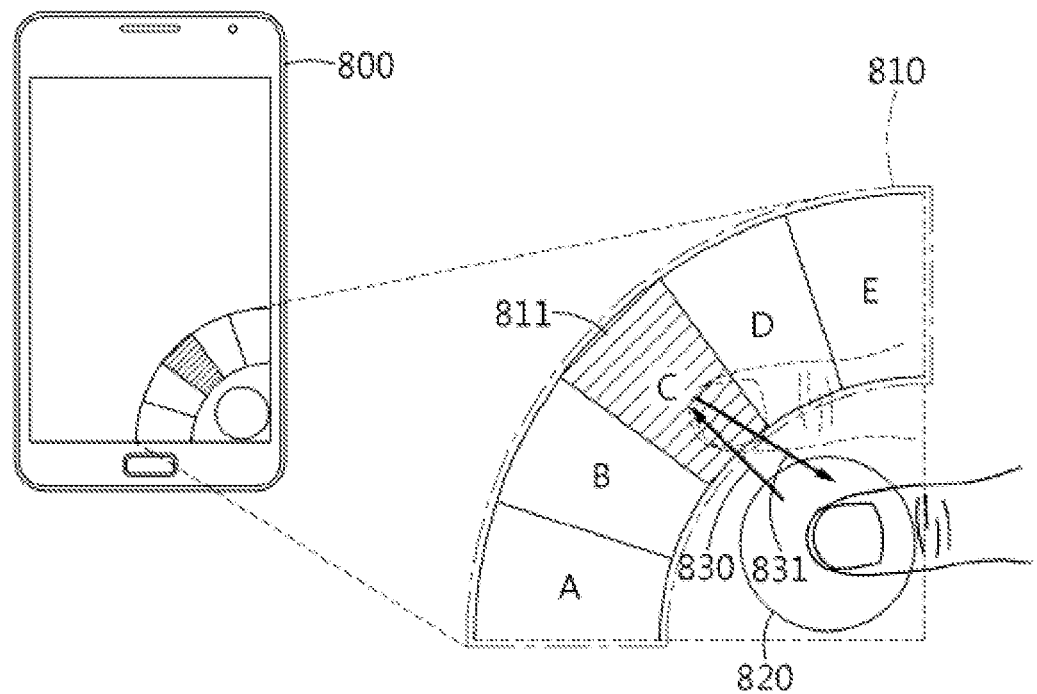
[FIG. 9]
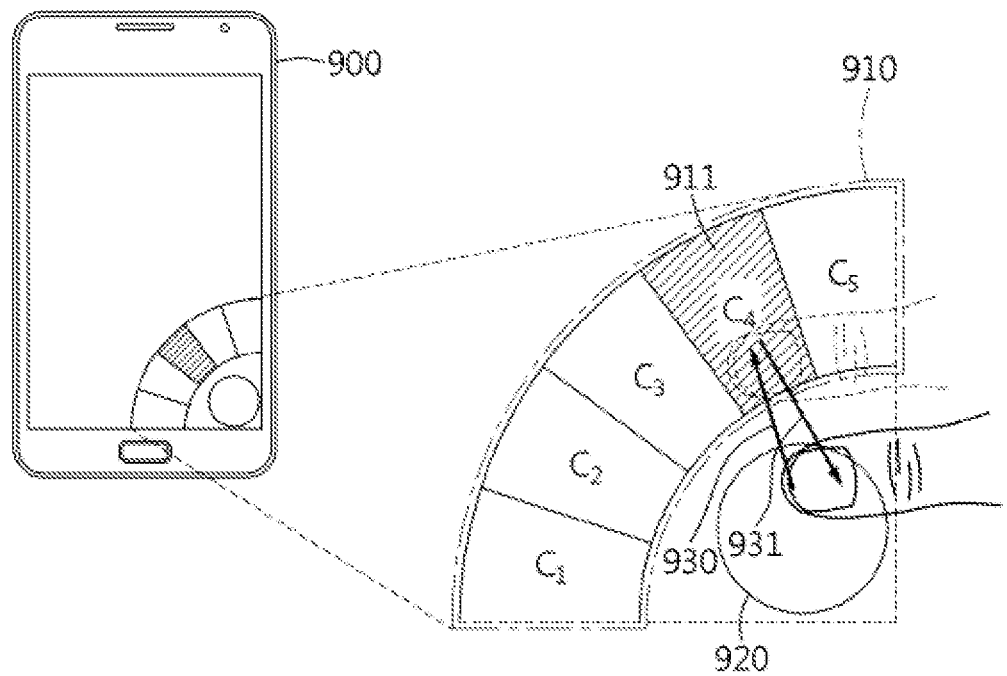

[FIG. 10]
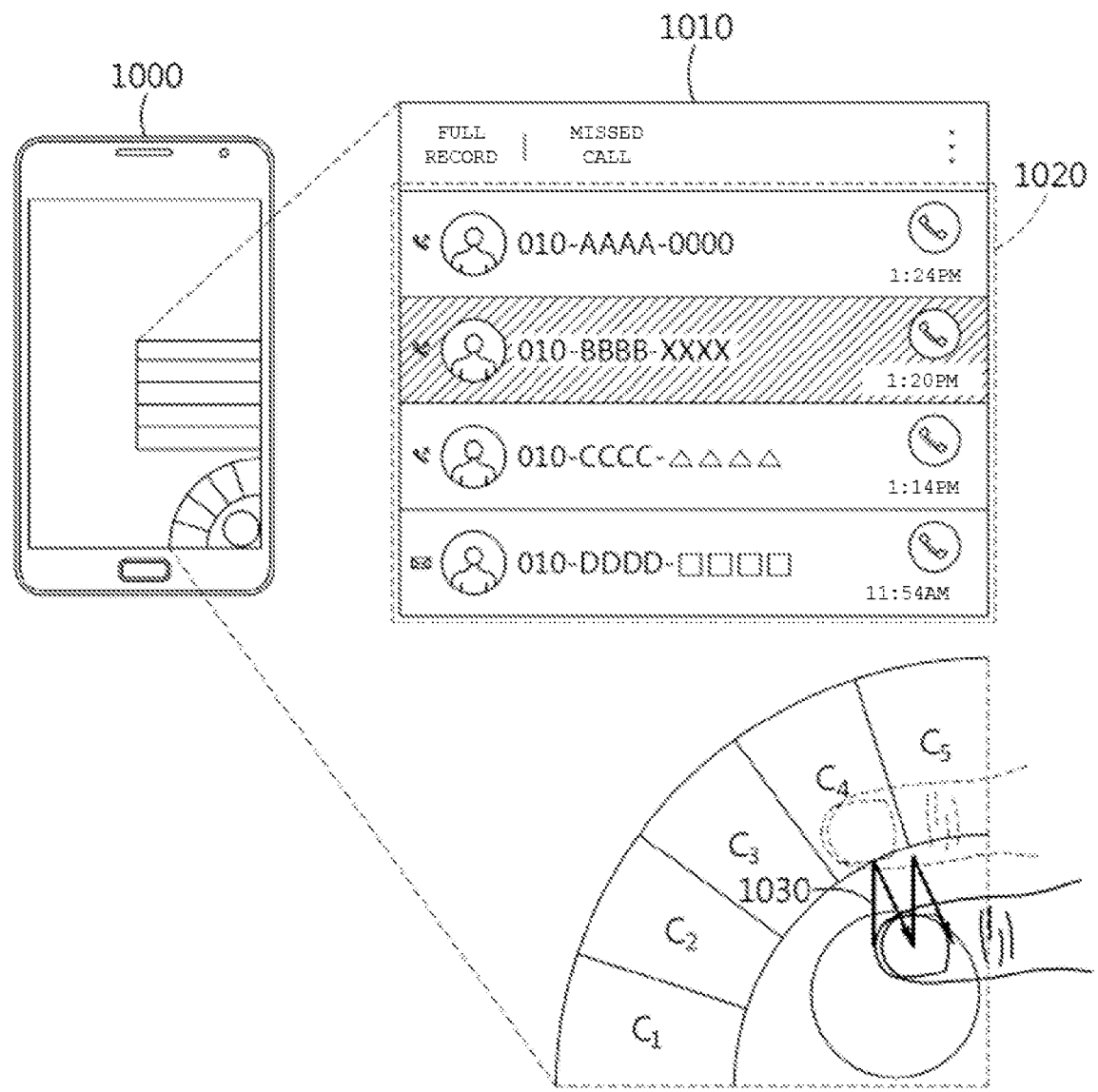

[FIG. 11]
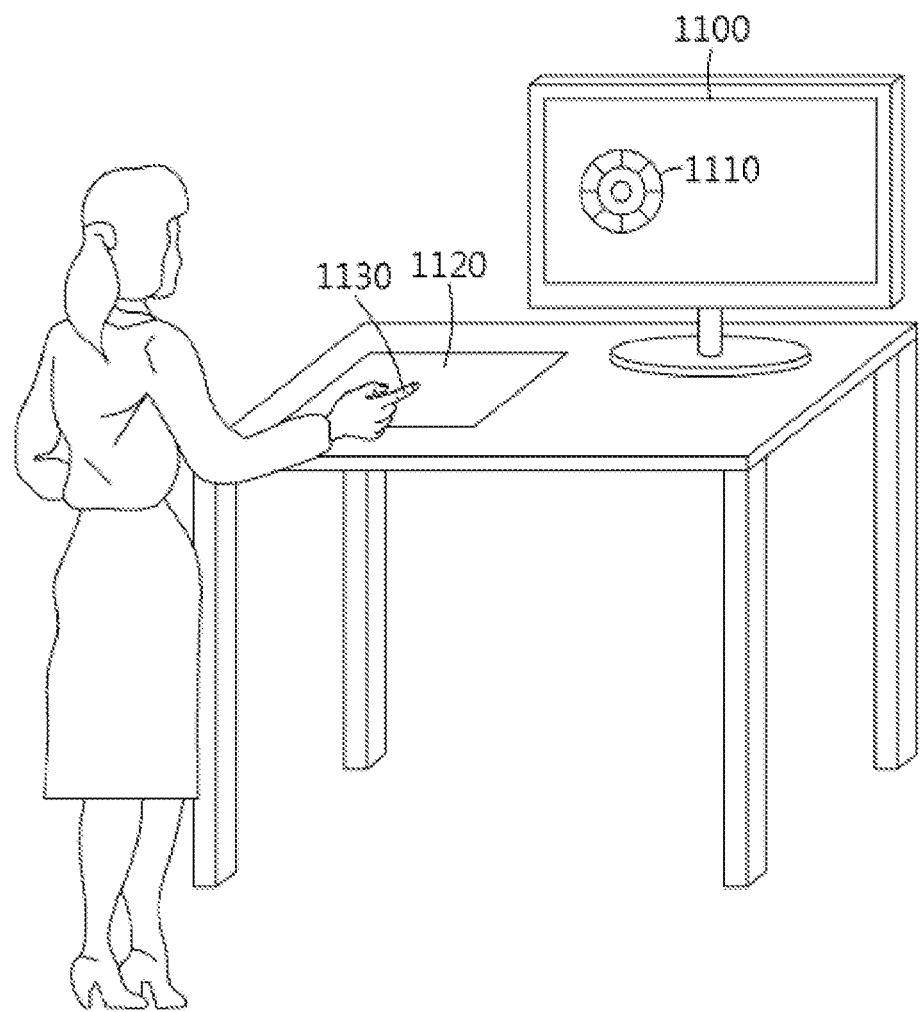

[FIG. 12]
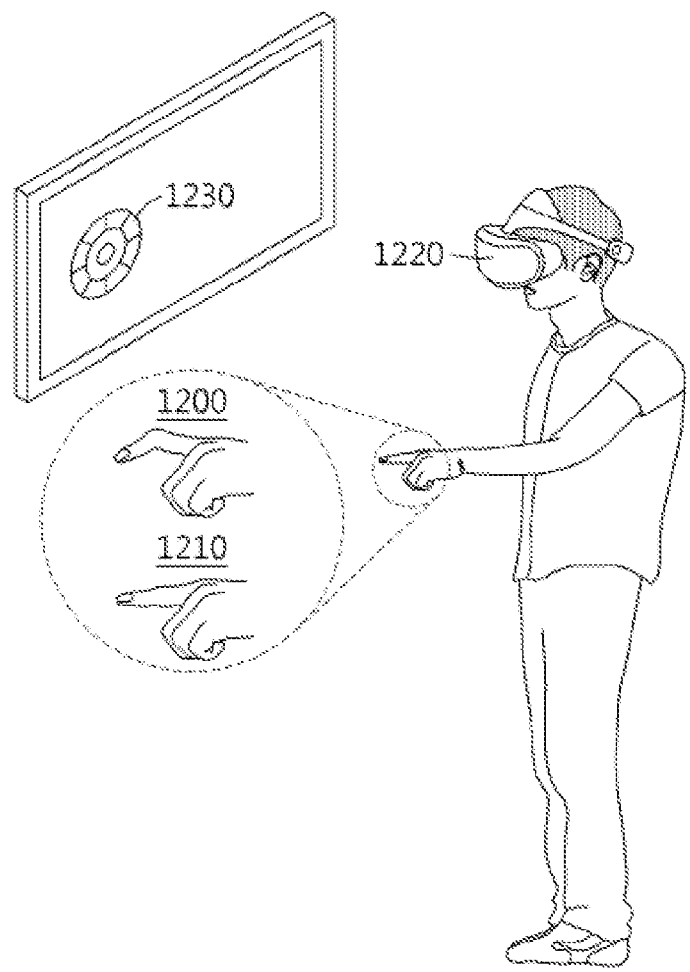
[FIG. 13]
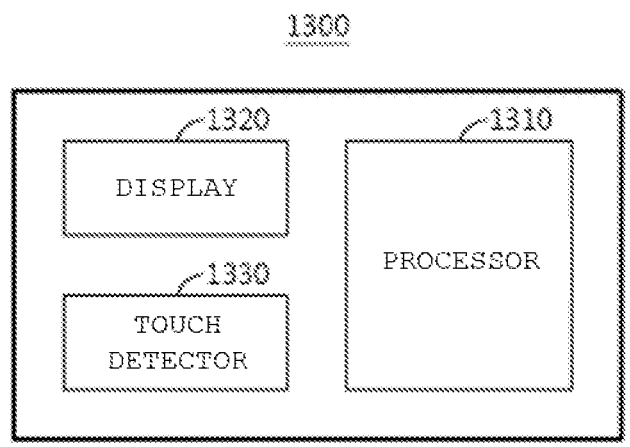

METHOD FOR OUTPUTTING COMMAND METHOD

FIELD OF INVENTION

Hereinafter, provided is technology for recognizing touch input and touch release and outputting and executing a command menu.

BACKGROUND OF INVENTION

In an electronic device for executing a command using touch input, a process of finding and executing a desired command is accompanied by a plurality of touch inputs and touch input releases. Accordingly, a process of outputting and executing a command menu is complicated and requires many processes to process a command.

In addition, after a user wakes up an electronic device from a power saving mode using a fingerprint or facial recognition, a process of executing a command requires an additional operation of applying touch input.

SUMMARY OF INVENTION

Technical Solution

Depending on an embodiment, a method of outputting a command menu includes outputting an upper graphic object indicating an upper layer menu among the command menus at a point from which touch input is detected, in response to a case in which the touch input of a user is detected, detecting a point to which the touch point is moved in response to touch movement input of moving the touch input while the touch input of the user is maintained, selecting the target upper item corresponding to the moved point among candidate upper items of the upper layer menu, outputting a lower graphic object indicating a lower layer menu corresponding to the selected target upper item while extending the lower graphic object from the upper graphic object, detecting a drop input of releasing the touch point from the lower layer menu, and executing an operation corresponding to one of the target lower item in response to a case in which the drop input is detected from a point corresponding to one target lower item of candidate lower items of the lower layer menu.

Depending on an embodiment, the executing an operation corresponding to one of the target lower item may include outputting a graphic object for requesting user approval in response to whether the operation is executed before the operation corresponding to the target lower item is executed.

Depending on an embodiment, the method may further include acquiring biometric information of the user in response to the touch input of the user, matching the biometric information and registered user information from a registered database, granting access authority for at least one of an application, a device, and a menu to the user in response to a case in which matching is successful, and outputting at least one of an upper graphic object and a lower graphic object based on the granted access authority.

Depending on an embodiment, the detecting the drop input may further include selecting a target lower item corresponding to a point of a candidate lower item of the lower layer menu, and visualizing information on the target lower item semi-transparently and overlaying and outputting a graphic object for the lower layer menu on information on the target lower item.

Depending on another embodiment, the method may further include detecting an external touch input of at least one point of a region outside a graphic object for the layer menu, detecting a movement trajectory of the external touch input, and rotating the graphic object based on the movement trajectory when the touch input is maintained in a region inside a graphic object for the layer menu.

Depending on another embodiment, the method may further include detecting an external touch for at least one point from a region outside a graphic object for the layer menu, detecting a movement trajectory of the external touch input, and moving at least a portion of the graphic object in an identified direction based on the external touch input.

In the method of outputting a command menu, when a number of items of the lower layer menu is greater than a predetermined number, a graphic object indicating some items of the candidate lower items of the lower layer menu may be output, and at least some of remaining items except for the some items may be exposed and output of at least some of the some items may be excluded in response to user input distinct from the touch input.

In the method of outputting a command menu depending on an embodiment, an item array combination of the lower graphic object may be output around one item of the upper layer menu based on an execution history of the user.

Depending on another embodiment, a method of outputting a layered command menu on a display includes outputting an upper graphic object indicating an upper layer menu among the command menus at a reference point from which the touch input is detected, in response to a case in which the user touch input is detected, detecting a touch point moved from the reference point in response to touch movement input of moving the touch input while the user touch input is maintained, selecting a target upper item from the upper layer menus in response to a case in which the touch point is moved to a point indicating a target upper item of a candidate upper item of the upper layer menu is moved, detecting a touch return movement input in which the touch point returns to the reference point after the target upper item is selected, and replacing the upper graphic object with a lower graphic object indicating a lower layer menu corresponding to the target upper item and outputting the replaced lower graphic object in response to a case in which the touch return movement input is detected.

Depending on another embodiment, a method of outputting a layered command menu on a display includes, in response to a case in which a manipulation detector detects touch input of a user, outputting a manipulation indicator at a portion of the display, indicating a touch point from which the touch input is detected, outputting an upper graphic object indicating an upper layer menu among the layered command menus on the display based on the manipulation indicator, detecting a point to which the manipulation indicator is moved, in response to touch movement input of moving the touch input while the user touch input is maintained, selecting a target upper item corresponding to the point to which the manipulation indicator is moved among candidate upper items of the upper layer menu, outputting a lower graphic object indicating a lower layer menu corresponding to the target upper item while extending the lower graphic object from the upper graphic object, detecting a drop input of releasing the touch point from a point corresponding to one target lower item among candidate lower items of the lower layer menu, and in response to a case in which the drop input is detected, executing an operation corresponding to the target lower item.

BRIEF DESCRIPTION OF DRAWINGS

FIG. 1 is a flowchart of a method of outputting a command menu on a large screen depending on an embodiment.

FIG. 2 is a diagram showing an upper graphic object for explaining a method of outputting a command menu on a large screen depending on an embodiment.

FIG. 3 is a diagram showing a lower graphic object for explaining a method of outputting a command menu on a large screen depending on an embodiment.

FIG. 4 is a diagram showing a graphic object indicating some items of a command menu on a large screen depending on an embodiment.

FIG. 5 is a diagram showing rotation of a graphic object depending on an embodiment.

FIG. 6 is a diagram movement of a graphic object depending on an embodiment.

FIG. 7 is a flowchart of a method of outputting a command menu on a small screen depending on an embodiment.

FIG. 8 is a diagram showing an upper graphic object for explaining a method of outputting a command menu on a small screen depending on an embodiment.

FIG. 9 is a diagram showing a lower graphic object for explaining a method of outputting a command menu on a small screen depending on an embodiment.

FIG. 10 is a diagram showing a graphic object indicating some items of a command menu on a small screen depending on an embodiment.

FIG. 11 is a diagram for explaining a method of outputting a command menu when a touch detector and a display are separated from each other depending on an embodiment.

FIG. 12 is a diagram for explaining a method of outputting a command menu in virtual reality depending on an embodiment.

FIG. 13 is a block diagram showing the overall configuration of an apparatus for outputting a command menu depending on an embodiment.

BEST MODE

Particular structural and functional descriptions of embodiments are only for the purpose of describing particular embodiments and are formed in many different forms. Thus, the embodiments should not be construed as being limited to the embodiments set forth herein, and all changes, equivalents, and substitutes that do not depart from the technical scope are encompassed in the specification.

Terms such as "first" and "second" are used herein merely to describe a variety of constituent elements, but the terms are used only for the purpose of distinguishing one constituent element from another constituent element. For example, a first element may be termed a second element, and a second element may be termed a first element.

When an element is referred to as being "connected to" or "coupled to" another element, it may be directly on, connected or coupled to the other element, or intervening elements may be present.

The singular expressions in the present specification include plural expressions unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, embodiments will be described in detail with reference to the accompanying drawings. Like reference numerals in each figure indicate like elements.

In response to detection of user touch input, a processor depending on an embodiment may wake up a device in a power saving mode or a power off state, or may call a command menu for executing a command in a device that is already turned on. The user touch input may include, but is not limited to, a case in which a device detects touch of any part of the user body and may include a case in which the device senses the part of the user body through an input device. For example, the input device may be a mouse or a sensor installed in a display, and in response to detection of user touch input, the mouse or the sensor may transmit an electrical signal to a processor.

FIG. 1 is a flowchart of a method of outputting a command menu on a large screen depending on an embodiment.

In operation 100, in response to detection of user touch input, a processor may output an upper graphic object indicating an upper layer menu among layered command menus at a touch point from which the touch input is detected.

The layer menu may be a combination of at least two layers. The upper layer menu and the lower layer menu may be relatively determined depending on a layer stage. For example, when the layer menu includes three layers, the uppermost layer menu to the lowermost layer menu may sequentially be a first layer menu, a second layer menu, and a third layer menu. The first layer menu may be a higher layer than the second layer menu, and thus, between the first layer menu and the second layer menu, the first layer menu may be an upper layer menu, and the second layer menu may be a lower layer. In contrast, the second layer menu may be a higher layer than the third layer menu, and thus, between the second layer menu and the third layer menu, the second layer menu may be an upper layer menu, and the third layer menu may be a lower layer menu.

In operation 110, the processor may detect a point to which a touch point is moved in response to touch movement input of moving the touch point while the user touch input is maintained.

The touch movement input may indicate an input of moving a point from which the touch input is detected. For example, the touch movement input may be an input of dragging the touch point while the touch input is maintained.

In operation 120, the processor may select a target upper item corresponding to the moved touch point among candidate upper items of the upper layer menu. The layer menu may include a plurality of candidate items, and the target item may be an item selected by the touch movement input among the candidate items. For example, in response to the case in which the touch point enters an item graphic object indicating an arbitrary item among the candidate items, the processor may select the corresponding item as the target item. In response to the case in which an area equal to or greater than a predetermined ratio is detected from a region in which the touch is formed, the processor may determine the touch point to enter the item graphic object.

The upper layer menu may include at least one upper item, and a lower layer menu may be mapped to each of at least one upper item. The lower layer menu may include at least one lower item, and a next lower layer menu may be mapped to each of at least one lower item. For reference, although FIGS. 2, 3, 5, and 6 show the case in which the number of items included in each upper layer menu and each lower layer menu is 8, the embodiments are not limited thereto and may be changed depending on a design.

In operation 130, the processor may output the lower graphic object indicating the lower layer menu corresponding to the selected upper item while extending the lower graphic object from the upper graphic object indicating the upper layer menu. For example, the processor may output a lower graphic object in the form of surrounding an outer boundary of the upper graphic object in an outward direction from the upper graphic object. However, without being limited thereto, the processor may output a lower graphic object in the form of covering a part of the outer boundary of the upper graphic object. In this case, the processor may extend the lower graphic object in a direction toward the touch movement input. Thus, while the processor extends the lower graphic object from the upper graphic object, the touch movement input may be directed in one direction consistently.

In operation 140, the processor may detect a drop input of releasing the touch point from the lower layer menu. The drop input may be an input of releasing the touch point and may indicate an input of terminating the touch input at an arbitrary point.

In operation 150, in response to the case in which the drop input is detected at a point corresponding to one target lower item among candidate lower items of the lower layer menu, the processor may execute an operation corresponding to the target lower item. The target lower item may be an item selected among lower candidate items depending on the touch movement input. An operation corresponding to the lower item may be pre-stored in a memory, and for example, various operations such as application execution, preview display, and execution of a function of a device may be allocated to respective lower items. The memory in which the operation is pre-stored may be included in a device including the processor, but is not limited thereto, and the memory may be included in an external cloud device and the processor may communicate with the external cloud device to receive an operation. For example, when "Execute Application A" is allocated to the selected target lower item, the processor may execute application A by loading an operating process related to "Execute Application A" from the memory.

Although FIG. 1 shows only the graphic object including the upper layer menu and the lower layer menu, the embodiments are not limited thereto, and thus a method of outputting a command menu may also include performing a command operation by outputting a graphic object indicating layer menus of three stages or more.

A command menu outputting apparatus depending on an embodiment may provide a command menu based on authority while authenticating a user.

For example, the processor may acquire biometric information of the user in response to the user touch input. The biometric information of the user may be data related to a fingerprint of the user. The data related to the fingerprint of the user may include a pattern of the fingerprint and an interval between curves of the fingerprint. Depending on an embodiment, the data related to the fingerprint of the user may include a rate of change in the interval between the curves of the fingerprint over time. When the rate of change in the interval between the curves of the fingerprint over time is not changed, the processor may determine that the finger of the user is not moved. In contrast, when the rate of change in the interval between the curves of the fingerprint is equal to or greater than a threshold value, the processor may determine that the touch input is unstable and may skip a matching operation between the biometric information of the user to be described below and registered user information.

The processor may match the biometric information of the user and the registered user information. The processor may match biometric information from a registered database and the registered user information. The registered database may be stored in a memory associated with the processor, and the registered database may include user information (e.g., information on a registered fingerprint of each user) on a plurality of users. When registered user information related to a plurality of users is stored in the registered database, the processor may calculate matching similarity between a plurality of pieces of registered user information and the user biometric information. The processor may determine that the user biometric information matches the corresponding registered user information in response to the case in which the matching similarity calculated for arbitrary registered user information exceeds critical similarity. The processor may determine that matching is successful when there is information that matches the user biometric information among a plurality of pieces of registered user information.

In response to the case in which matching is successful, the processor may grant access authority for at least one of an application, a device, and a menu. Depending on an embodiment, the access authority for at least one of an application, a device, and a menu may be individually set differently for each user. The registered user information may include information on the access authority granted to the registered user, and for example, information on the application, the device, and the menu that the corresponding registered user accesses may be stored. When matching is successful, the processor may identify the application, the device, and the menu, which are permitted to the matched user, while loading the matched registered user information from the memory. For example, when a first user is a minor, the processor may load the stored information on the application, the device, and the menu that the first user is capable of accessing. Since the first user is a minor, the application, the device, and the menu that the first user is capable of accessing may be limited.

The processor may output at least one of the upper graphic object or the lower graphic object based on the granted access authority. For example, the processor may output a graphic object of a layer menu (e.g., an upper layer menu or a lower layer menu) including items indicating an operation that an arbitrary user is capable of accessing. In response to the case in which a non-authorized user attempts access, the processor may also output a layer menu in a guest mode.

FIG. 2 is a diagram showing an upper graphic object for explaining a method of outputting a command menu on a large screen depending on an embodiment.

The method of outputting a command menu depending on an embodiment may be performed by an apparatus 200 including a large-screen display. The apparatus 200 including a large-screen display may have a relatively wide area for outputting a graphic object related to command menus. The apparatus 200 including the large-screen display may be embodied in various forms of products such as a television (TV), a personal computer, a laptop computer, an intelligent vehicle, or a kiosk. For example, depending on embodiments, a graphic object indicating a layer menu may be output in response to user touch input detected by a display of a TV. After the graphic object is called, a graphic object indicating lower layer menus may be output toward a margin space of a large-screen display in response to touch movement input. However, the apparatus 200 including a large-screen display is not limited only to the aforementioned embodiment, and may include an apparatus including a display that is difficult to grip with one hand.

When detecting touch input of a user, the processor of the apparatus 200 including a large-screen display may output an upper graphic object 210 indicating the upper layer menu among layered command menus based on a touch point 220 from which the touch input is detected.

Depending on an embodiment, as shown in FIG. 2, the touch point 220 from which the touch input is detected may be output to a display. However, for convenience of description, FIG. 2 shows the touch point 220, and the touch point 220 may not be output.

While the touch input is maintained, the processor may detect a point to which the touch point is moved in response to touch movement input 230 from the detected touch point 220. Referring to FIG. 2, in response to the touch movement input 230, the point to which the touch point is moved may be positioned at one item of the upper graphic object.

When the touch point is positioned on one item of the upper graphic object, the processor may determine that a corresponding item is selected. Thus, the processor may select a target upper item 211 corresponding to the moved point among candidate upper items of the upper layer menu. For example, the processor may select the target upper item 211 depending on whether a touch region occupies a critical ratio or greater of a graphic object corresponding to the target upper item 211. For example, in response to the case in which the touch region detected by the display occupies 50% or greater of a graphic object indicated by the target upper item 211, the processor may select the target upper item 211.

FIG. 3 is a diagram showing a lower graphic object for explaining a method of outputting a command menu on a large screen depending on an embodiment.

A processor of an apparatus 300 may output a lower graphic object 320 indicating a lower layer menu corresponding to a selected upper item while extending the lower graphic object 320 from an upper graphic object 310.

As shown in FIG. 3, the upper graphic object 310 may be shaped like a circle with an empty inside, and for example, may be shaped like a donut. The lower graphic object 320 may be shaped like a circle that is in contact with an outer circumference of the upper graphic object 310 and accommodates the upper graphic object 310. However, the shapes of the upper graphic object 310 and the lower graphic object are not limited thereto, and in another example, the lower graphic object may be shaped like a sector, and the processor may output the lower graphic object shaped like a sector in a direction extending from the upper graphic object 310 based on a target upper item 311.

After the lower graphic object 320 is output, the processor may detect a point to which the touch point is moved in response to detection of touch movement input 330. When the point to which the touch point is moved is a point corresponding to one target lower item 321 among candidate lower items of the lower layer menu, the processor may select the target lower item 321.

Depending on an embodiment, in response to the case in which the target lower item 321 is selected, the processor may visualize information on the target lower item 321 semi-transparently, and may overlay and output a graphic object for the lower layer menu on the information on the target lower item 321. The information on the target lower item 321 may be preview information (e.g., a preview image) related to the target lower item 321. However, the information on the target lower item 321 is not limited thereto, and may include various pieces of information that a user is capable of referring to for performing an operation related to the target lower item 321. For example, when the target lower item 321 is "missed call", the information on the target lower item 321 may be a missed call list.

Depending on an embodiment, when a lower layer menu of the target lower item 321 is further present, the processor may output a graphic object indicating a lower layer item of the target lower item 321 in a direction extending from the lower graphic object 320.

The processor may detect a drop input of releasing a touch point from a point corresponding to one target lower item 321 among candidate lower items 322 of the lower layer menu. The processor may execute an operation corresponding to the target lower item 321 in response to the case in which the drop input is detected.

Depending on an embodiment, even if a lower layer menu of the target lower item 321 is further present, when the processor detects the drop input of releasing the touch point corresponding to the target lower item 321, the processor may pop up the lower layer menu of the target lower item 321. For example, a pop-up operation may be an operation of visualizing and extending graphic expression corresponding to the lower layer menu to an entire screen starting from the target lower item 321.

Depending on an embodiment, before executing an operation corresponding to the target lower item 321, the processor may output a graphic object for requesting user approval as to whether to execute the operation. The graphic object for requesting user approval may include a graphic object (e.g., a message window) for asking the user whether to execute the operation. In response to the graphic object for asking whether to execute the operation, a graphic object for allowing the user to select to execute the operation may be output. When detecting the touch input as to whether to execute the operation, the processor may determine whether to execute the corresponding operation. The processor may execute the corresponding operation in response to the case in which approval manipulation (e.g., activation of an approval button) for execution of the operation is received from the user. The processor may exclude execution of the corresponding operation in response to receiving rejection manipulation (e.g., activation of a reject button) for execution of the operation from the user.

Depending on another embodiment, when detecting the drop input of the user at a point corresponding to the target lower item and then detecting the touch input at the point corresponding to the target lower item within a predetermined time, the processor may execute an operation corresponding to the target lower item. In response to the case in which the drop input is detected from the target lower item, the processor may not immediately execute the operation corresponding to the target lower item, and may wait and execute the operation only when the touch input of the corresponding target lower item is detected once again, and accordingly, it may be possible to prevent an erroneous operation in which the operation is executed differently from user intention.

Depending on an embodiment, the processor may determine an item array combination of the lower graphic object 320 based on an execution history of the user and may output the determined item array combination around one item of the upper layer menu. The execution history may be, but is not limited to, a frequency of execution of an operation, a frequency of selection of an item, or the like, and may be a sequence of recent execution. The processor may output lower candidate items around the target upper item in an order from a lower candidate item with the highest priority depending on the execution history. For example, with respect to the target upper item 'A', the processor may position the most selected or executed lower candidate item 'A1' around the target upper item 'A'.

FIG. 4 is a diagram showing a graphic object indicating some items of a command menu on a large screen depending on an embodiment.

When the number of items of the lower layer menu is greater than a predetermined number, the processor may output a graphic object 410 indicating some items 430 among candidate lower items of the lower layer menu on a display 400. Then, in response to user input 420 distinct from touch input, the processor may expose at least some of remaining items except for the some items 430 and may exclude output of at least some of the some items 430.

The processor may output only the some items 430 of the candidate lower item on the graphic object 410. The graphic object 410 may be a graphic object formed by listing candidate lower items. The user input 420 may be scroll input, and the scroll input may be touch movement input of moving a touch point in a direction in which candidate lower items are listed (e.g., a vertical direction in FIG. 4). In response to the case in which the touch movement input in the direction in which candidate lower items are listed is detected, the processor may expose some of remaining items except for the some items 430, and in response thereto, may exclude output of some of the some items 430.

As shown in an example of FIG. 4, the processor may expose only the some items 430 among candidate lower items related to a phone number, may output the some items 430 on the graphic object 410, and may exclude output of remaining items except for the some items 430. In response to the case in which touch movement input toward an upper end from a lower end of the graphic object 410 is detected in a direction in which the candidate lower items are listed, the processor may expose some of the remaining items. The processor may exclude output of some of the some items 430 that have been exposed on the graphic object 410 in response to a portion of the graphic object 410, which is additionally exposed.

FIG. 5 is a diagram showing rotation of a graphic object depending on an embodiment.

The processor may detect external touch inputs 521 and 522 of at least one point of a region outside a graphic object for a layer menu. The processor may detect a movement trajectory 530 of the external touch input. When touch input 520 is maintained in a region 510 inside the graphic object, the processor may rotate the graphic object based on the movement trajectory 530.

The region outside the graphic object may be a remaining region except for a portion occupied by the graphic object in the display. The movement trajectory 530 of the external touch input may be shaped like, for example, a curve, and the processor may determine whether the movement trajectory 530 is clockwise or counterclockwise. For example, when the movement trajectory 530 is detected to be clockwise, the processor may rotate the graphic object clockwise. As the processor rotates the graphic object, a direction in which the lower layer menu is output may be adjusted. Thus, the user may position an item hidden by his or her finger into his or her field of view by rotating the graphic object. In addition, a margin of the display may be effectively utilized. For reference, when the graphic object is rotated, the processor may gradually rearrange graphic objects corresponding items clockwise or counterclockwise based on a reference point (e.g., the center of a circle). The processor may rearrange only the position of each graphic object while maintaining the shape of each graphic object rather rotating the same.

FIG. 6 is a diagram movement of a graphic object depending on an embodiment.

The processor may detect an external touch input 621 of at least one point of a region outside the graphic object for the layer menu. The processor may detect a movement trajectory of the external touch input 621. When touch input 620 is maintained in a region 610 inside the graphic object, the processor may move the graphic object based on a movement trajectory 630. The processor may move at least a portion of the graphic object in identified directions 630 and 631 based on the external touch input 621.

In response to the case in which the movement trajectory of the external touch input 621 is identified to be a straight line, the processor may detect touch movement input direction of the external touch input 621. The processor may move at least a portion of the graphic object in the identified directions 630 and 631 based on the external touch input 621. At least a portion moved in the graphic object may be, but is not limited to, a graphic object except for a graphic object for the uppermost layer menu, but the graphic object may be entirely moved. When a margin of the display is not left to the extent that a lower layer menu, which is no longer added, is not output in a direction in which the lower layer menu is output, the processor may move the graphic object and may output the added lower layer menu depending on user input.

FIG. 7 is a flowchart of a method of outputting a command menu on a small screen depending on an embodiment.

Operations 700 to 720 of outputting a graphic object at a reference point at which touch input is detected and then selecting a target upper item are the same as the above description of operations 100 to 120 of FIG. 1, and thus a detailed description thereof is omitted.

In operation 730, the processor may detect a touch return movement input in which the touch point returns to the reference point after the target upper item is selected. The reference point may be a point corresponding to a touch point at which a display touch input of a user is generated. The processor may detect a touch return movement input of returning from the touch point detected in response to the touch movement input to the reference point after the target upper item is selected.

In operation 740, in response to the case in which the touch return movement input is detected, the processor may replace a graphic object indicating an upper layer menu with a graphic object indicating a lower layer menu corresponding to the target upper item and may output the same. As the upper layer menu is replaced with the lower layer menu, a portion of the display, occupied by the graphic object, may not be increased, and thus, it may be easy to output a command menu on a small screen with a small display margin compared with a large screen. In addition, a small-screen apparatus is often held with one hand, and thus movement of the touch movement input may be shorter than in the case in which a command menu is output on a large screen. In response to the touch return movement input, the graphic object indicating the lower layer menu is replaced and output, and thus the command menu to the lowermost layer menu from the uppermost layer menu may be output with relatively short movement of the touch movement input. Here, the uppermost layer menu and the lowermost layer menu may correspond to layer menus of uppermost and lowermost stages depending on an embodiment.

Operations 750 and 760 are the same as the above description of operations 140 and 150 of FIG. 1, and thus a detailed description thereof is omitted.

FIG. 8 is a diagram showing an upper graphic object for explaining a method of outputting a command menu on a small screen depending on an embodiment.

The method of outputting a command menu depending on an embodiment may be performed by an apparatus 800 including a small-screen display. The apparatus 800 including a small-screen display may have a relatively small area for outputting a graphic object related to command menus compared with a large-screen display. The apparatus 800 including a small-screen display may be embodied in various forms of products such as a smartphone, a tablet PC, a smart electronic device, an intelligent vehicle, an intelligent vehicle, or a wearable device. For example, depending on embodiments, in response to user touch input detected by a display of a smartphone, a graphic object indicating a layer menu may be output. In response to a touch return movement input 831, after a graphic object is called, a graphic object indicating lower layer menus may replace a graphic object indicating upper layer menus and may be output. However, the apparatus 800 including a small-screen display is not limited only to the above embodiments, and may be an apparatus including a display to be gripped by one hand.

When detecting touch input of a user, a processor of the apparatus 800 including a small-screen display may output an upper graphic object 810 indicating an upper layer menu among layered command menus based on a reference point 820 from which touch input is detected.

Depending on an embodiment, as shown in FIG. 8, the reference point 820 from which the touch input is detected may be output on a display, and FIG. 8 is a diagram for explaining the reference point 820, but depending on another embodiment, the reference point 820 may not be output on the display.

While the touch input is maintained, the processor may detect a point to which the touch point is moved in response to touch movement input 830 from the detected reference point 820. Referring to FIG. 8, the point to which the touch point is moved in response to the touch movement input 830 may be positioned on one item of the upper graphic object.

When the touch point is positioned on one item of the upper graphic object, the processor may determine that the positioned item is selected. Thus, the processor may select a target upper item 811 corresponding to the selected point among candidate upper items of the upper layer menu. Selection of the target upper item may be determined depending on whether the touch point occupies a critical ratio or greater of a graphic object indicated by the target upper item. For example, in response to the case in which the touch point detected by the processor corresponds to 50% or greater of the graphic object indicated by the target upper item, the processor may determine that the upper item is selected.

After the target upper item 811 is selected, the processor may detect the touch return movement input 831 in which the touch point returns to the reference point 820. The touch return movement input 831 may be an input of a direction corresponding to the touch movement input. A trajectory of the touch movement input may be formed in an opposite direction to a movement direction of the touch movement input, but is not limited thereto, and a trajectory of moving a touch point to the reference point from the target upper item may be formed.

A graphic object related to a menu depending on an embodiment may be shaped like a sector, but may be shaped like a circle that radiates based on the reference point. The shape of the graphic object is not limited thereto, and the graphic object may be configured for a user to select a menu item.

FIG. 9 is a diagram showing a lower graphic object for explaining a method of outputting a command menu on a small screen depending on an embodiment.

In response to the case in which a touch return movement input 931 is detected, a processor of an apparatus 900 may replace a graphic object indicating an upper layer menu with a graphic object indicating a lower layer menu corresponding to the target upper item and may output the same.

Depending on an embodiment, the processor may detect a drop input of releasing a touch point from a point corresponding to one target lower item 911 among candidate lower items of the lower layer menu. In response to the case in which the drop input is detected, the processor may execute an operation corresponding to the target lower item 911.

Depending on another embodiment, when the touch point deviates from a point corresponding to the target lower item 911 depending on touch movement input having an acceleration equal to or greater than a critical acceleration, the processor may execute an operation corresponding to the target lower item 911. For example, in response to the case in which the touch point is moved to an external point of a graphic object 910 of a layer menu from the target lower item 911, the processor may calculate a moving acceleration of the touch point to the external point from the target lower item 911. In response to the case in which the moving acceleration of the touch point to the external point from the target lower item 911 exceeds the critical acceleration, the processor may execute an operation corresponding to the target lower item 911. Compared with the case in which an operation is performed in response to a drop input of releasing the touch point, execution of an operation depending on touch movement input with an acceleration may prevent the operation from being executed differently from user intention.

Before executing an operation corresponding to the target lower item 911, the processor may output a graphic object for requesting user approval in response to whether to execute the operation. Depending on another embodiment, when the drop input of the user is detected from the target lower item 911 and the touch input is detected from a point corresponding to the target lower item again, the processor may execute an operation corresponding to the target lower item.

Depending on another embodiment, the processor may detect the touch return movement input 931 of selecting the target lower item 911 and then moving the touch point to return to a reference point 920 depending on touch movement input 930. In response to the case in which the touch return movement input 931 is detected, the processor may replace the lower graphic object 910 with a graphic object indicating an additional lower layer menu corresponding to the target lower item 911 and may output the same.

FIG. 10 is a diagram showing a graphic object indicating some items of a command menu on a small screen depending on an embodiment.

When the number of items of the lower layer menu is greater than a predetermined number, a processor of an apparatus 1000 may output a graphic object 1010 indicating some items 1020 among candidate lower items of the lower layer menu on a display. Then, in response to user input distinct from touch input, the processor may expose at least some of remaining items except for the some items 1020 and may exclude output of at least some of the some items 1020.

The processor may output only the some items 1020 of the candidate lower item on the graphic object 1010. The graphic object 1010 may be a graphic object formed by listing candidate lower items. The user input may be a two-touch round-trip input 1030 corresponding to a desired scrolling direction, distinct from the touch input and the touch return movement input. The touch round-trip input may include touch movement input and a touch return movement input in a direction corresponding to a touch movement direction. One touch round-trip input and the two-touch round-trip input 1030 may be distinguished depending on the number of round trip inputs detected for a predetermined time. In response to the two-touch round-trip input 1030 corresponding to a desired scrolling direction, the processor may expose some of remaining items except for the some items 1020, and in response thereto, may exclude output of some of the some items 1020.

As shown in an example of FIG. 10, the processor may list only the some items 1020 among candidate lower items related to a phone number and may output the list on the graphic object 1010. In response to the case in which the two-touch round-trip input 1030 corresponding to an upward direction from the reference point is detected, the processor may expose an item corresponding to an upper end of the graphic object 1010 among remaining items except for the some items 1020. In response to an item exposed out of an upper end of the graphic object 1010, output of some of the some items 1020, exposed out of a lower end of the graphic object 1010, may be excluded.

FIG. 11 is a diagram for explaining a method of outputting a command menu when a touch detector and a display are separated from each other depending on an embodiment.

Depending on an embodiment, a manipulation detector for detecting user manipulation may be physically separated from a display 1100, and an electrical signal detected by the touch detector may be transferred to a processor through a communication unit between the manipulation detector and the display 1100. In FIG. 11, the manipulation detector includes, for example, a touch detector 1120, but is not limited thereto.

In response to the case in which the touch detector 1120 detects user touch input 1130, a processor may output a manipulation indicator on a part of the display 1100, indicating a touch point from which touch input 1130 is detected. The manipulation indicator may be a graphic object displayed on the display 1100 to correspond to a point from which the touch input is detected.

An operation of outputting a graphic object 1110 related to a layered menu to correspond to the touch point and executing an operation corresponding to the target lower item among lower menus is the same as the above description of FIGS. 1 to 10, and thus a detailed description thereof is omitted.

FIG. 12 is a diagram for explaining a method of outputting a command menu in virtual reality depending on an embodiment.

Depending on an embodiment, a manipulation detector for detecting user input and a display may be physically separated from each other, and an electrical signal detected by the manipulation detector may be transferred to a processor through a communication unit between the manipulation detector and the display.

The manipulation detector may be a sensor for detecting movement of the body part of the user and may include, for example, a sensor for detecting finger joint movement. The manipulation detector may include a sensor implemented in the form of a glove for sensing bending and unfolding of the user knuckles. The sensor for sensing bending and unfolding of the user knuckles may be positioned in a portion corresponding to the user knuckle of the glove. The sensor may include a piezoelectric sensor, and in response to a piezoelectric signal generated when the finger is bent, the sensor may detect finger joint movement. However, the embodiments are not limited thereto, and the sensor may include a pressure sensor, and in response to the case in which a pressure generated by bending the user finger is sensed, the sensor may detect whether the finger is bent. However, the movement of the body part is not limited to detection of the movement of the finger joint and may include blinking of an eye, movement of legs and arms, and a joint motion of the body part.

Depending on another embodiment, the manipulation detector may be a sensor for detecting movement of the body part of the user and may include an image sensor for detecting hand movement. Sensing data of the image sensor including a camera may be transmitted to the processor, and the camera may photograph the user hand.

The embodiments are merely embodiments for detecting movement of the user hand, and methods of detecting whether the user finger is unfolded are not limited to the above embodiments and may use any method at a level of an ordinary skill in the art for detecting movement of the user hand, such as a wearable device for measuring an angle or a distance between joints, and electrical resistance.

The display may be a virtual display implemented through virtual reality, and virtual reality may be implemented by connecting a virtual reality device 1220 in contact with the user face to a processor. The virtual reality device 1220 may limit a user view, and only the display of virtual reality may be implemented by the processor. The virtual reality device 1220 may provide, for example, a right eye image to a right eye of the user and may provide a left eye image to a left eye of the user, and the right eye image and the left eye image may have disparity with each other. The virtual reality device 1220 may provide the aforementioned left eye image and the right eye image to the user, and thus may visualize and provide three-dimensional content to the user. Depending on another embodiment, the virtual reality device 1220 may not limit the user view, and the user may execute an operation related to a command item while viewing a screen on which virtual reality overlaps reality.

The processor may detect a state 1210 in which the user finger is unfolded and may output a graphic object 1230 indicating an upper layer menu among layered command menus with a manipulation indicator on a portion indicating a touch point corresponding to one end of the finger on the display of virtual reality.

The processor may detect touch movement input of moving a touch point corresponding to one end of the finger and may detect a point to which the manipulation indicator is moved as the touch point is moved while the state 1210 in which the user finger is unfolded is maintained. In response to detection of the point to which the manipulation indicator is moved, the processor may select a target upper item of the upper layer menu and may output a lower graphic object indicating a lower layer menu corresponding to the target upper item. The processor may detect a state 1200 in which the user finger is unfolded from a point corresponding to one target lower item among candidate lower items of the lower layer menu and may execute an operation corresponding to the target lower item.

FIG. 13 is a block diagram showing the overall configuration of an apparatus 1300 for outputting a command menu depending on an embodiment.

The apparatus 1300 for outputting a command menu may include a processor 1310, a display 1320, and a touch detector 1330. The processor 1310 may receive an electrical signal converted from touch input detected by the touch detector 1330. The processor 1310 may search for a point on the display 1320, corresponding to a touch point from which the touch input is detected, based on the received electrical signal. The processor 1310 may output a graphic object at a corresponding point on the display 1320 and may then perform a series of processes for executing an operation. The process for executing the operation after the graphic object is output is the same as the above description of FIGS. 1 to 12, and thus a detailed description thereof is omitted. For reference, although FIG. 13 illustrates the case in which the display 1320 and the touch detector 1330 are separate components, the embodiments are not limited thereto. The display 1320 and the touch detector 1330 may be integrally implemented as a sensitive display.

Depending on an embodiment, the apparatus 1300 for outputting a command menu may further include a memory of a registered database for storing registered user information that matches user biometric information. The processor 1310 may grant access authority to the user based on the registered user information stored in the memory.

The embodiments described above may be implemented by a hardware component, a software component, and/or a combination of a hardware component and a software component. For example, the device, the method, and the components described with regard to the embodiments may be implemented using one or more general-purpose computers or a special purpose computer, for example, a processor, a controller, an arithmetic logic unit (ALU), a digital signal processor, a microcomputer, a field programmable gate array (FPGA), a programmable logic unit (PLU), a microprocessor, or any other device for executing and responding to an instruction. The processing device may execute an operating system (OS) and one or more software applications executed on the OS. The processing device may access, store, manipulate, process, and generate data in response to execution of the software. For convenience of understanding, although one processing device is described as being used, those of ordinary skill in the art would understand that the processing device includes a plurality of processing elements and/or a plurality of types of processing elements. For example, the processing device may include a plurality of processors or one processor and one controller. In addition, the processing may also include other processing configurations such as a parallel processor.

Software may include a computer program, a code, an instruction, or a combination of one or more thereof and may configure the processing device to operate as described or may independently or collectively issue a command to the processing device. The software and/or data may be permanently or temporarily embodied by any type of machine, a component, a physical device, virtual equipment, a computer storage or device, or a received signal wave in order to be interpreted by the processing device or to provide a command or data to the processing device. The software may be distributed over a networked computer system and may be stored or executed in a distributed manner. The software and data may be stored in one or more computer-readable recording media.

The methods depending on the embodiments may be recorded in a computer readable medium including program commands for executing operations implemented through various computers. The computer readable medium may store program commands, data files, data structures or combinations thereof. The program commands recorded in the medium may be specially designed and configured for the present invention or be known to those skilled in the field of computer software. Examples of a computer readable recording medium include magnetic media such as hard disks, floppy disks and magnetic tapes, optical media such as CD-ROMs and DVDs, magneto-optical media such as floptical disks, or hardware devices such as ROMs, RAMS and flash memories, which are specially configured to store and execute program commands. Examples of the program commands include machine language code created by a compiler and high-level language code executable by a computer using an interpreter and the like. The hardware device described above may be configured to operate as one or more software modules to perform the operations of the embodiments, and vice versa.

As described above, although the embodiments have been described with reference to the limited drawings, those skilled in the art may apply various technical modifications and variations based on the above description. For example, the described technologies are performed in an order different from the described method, and/or the described components of a system, a structure, an apparatus, a circuit, etc. are coupled or combined in a different form than the described method or are substituted with other elements or equivalents or an appropriate result may be achieved despite substitution.

The invention claimed is:

1. A method of outputting a layered command menu on a display depending on user input, which is performed by a processor, the method comprising:

outputting an upper graphic object indicating an upper layer menu among the layered command menus at a reference point from which touch input is detected, in response to a case in which the touch input of a user is detected;

detecting a touch point moved from the reference point in response to touch movement input of moving the touch input while the touch input of the user is maintained;

selecting the target upper item from the upper layer menus in response to a case in which the touch point is moved to a point indicating a target upper item among candidate upper items of the upper layer menu;

detecting a touch return movement input in which the touch point returns to the reference point after the target upper item is selected; and replacing the upper graphic object with a lower graphic object indicating a lower layer menu corresponding to the target upper item and outputting the replaced lower graphic object in response to a case in which the touch return movement input is detected.

2. The method of claim 1, further comprising:
    detecting a drop input of the touch point from the lower layer menu; and
    executing an operation corresponding to a target lower item in response to a case in which the drop input is detected from a point corresponding to one target lower item among candidate lower items of the lower layer menu.

3. The method of claim 2, wherein the executing the operation corresponding to the target lower item includes outputting a graphic object for requesting user approval in response to whether the operation is executed before the operation corresponding to the target lower item is executed.

4. The method of claim 1, further comprising:
    acquiring biometric information of the user in response to the touch input of the user;
    matching the biometric information and registered user information from a registered database;
    granting access authority for at least one of an application, a device, and a menu to the user in response to a case in which matching is successful; and
    outputting at least one of an upper graphic object and a lower graphic object based on the granted access authority.

5. The method of claim 2, wherein the detecting the drop input further includes:
    selecting a target lower item corresponding to a point of a candidate lower item of the lower layer menu; and
    visualizing information on the target lower item semi-transparently and overlaying and outputting a graphic object for the lower layer menu on information on the target lower item.

6. The method of claim 1, further comprising:
    detecting an external touch input of at least one point of a region outside a graphic object for the layer menu;
    detecting a movement trajectory of the external touch input; and
    rotating the graphic object based on the movement trajectory when the touch input is maintained in a region inside a graphic object for the layer menu.

7. The method of claim 1, further comprising:
    detecting an external touch input for at least one point from a region outside a graphic object for the layer menu when the touch input is maintained in a region inside the graphic object;
    detecting a movement trajectory of the external touch input; and
    moving at least a portion of the graphic object in an identified direction based on the external touch input.

8. The method of claim 1, wherein, when a number of items of the lower layer menu is greater than a predetermined number, a graphic object indicating some items of the candidate lower items of the lower layer menu is output, and at least some of remaining items except for the some items are exposed and output of at least some of the some items is excluded in response to user input distinct from the touch input.

9. The method of claim 1, wherein an item array combination of the lower graphic object is output based on an execution history of the user.

10. A method of outputting a layered command menu on a display depending on user input, which is performed by a processor, the method comprising:
    in response to a case in which a manipulation detector detects touch input of a user at a reference point,
    outputting a manipulation indicator at the reference point, indicating a touch point from which the touch input is detected;
    outputting an upper graphic object indicating an upper layer menu among the layered command menus on the display based on the manipulation indicator;
    detecting a point to which the manipulation indicator is moved, in response to touch movement input of moving the touch input while the user touch input is maintained;
    selecting a target upper item corresponding to the point to which the manipulation indicator is moved among candidate upper items of the upper layer menu;
    detecting a touch return movement input in which the touch point returns to the reference point after the target upper item is selected and replacing the upper graphic object with a lower graphic object indicating a lower layer menu corresponding to the target upper item and outputting the replaced lower graphic object in response to a case in which the touch return movement input is detected;
    selecting a target lower item among candidate lower items of the lower layer menu depending on the touch movement input from the target upper item;
    detecting a drop input of releasing the touch point from a point corresponding to one of the target lower item and the next lower layer item; and
    in response to a case in which the drop input is detected, executing an operation corresponding to one of the target lower item and the next lower layer item.

11. A command menu outputting apparatus including a processor,
    wherein the processor outputs an upper graphic object indicating an upper layer menu among the command menus at a reference point from which the touch input is detected, in response to a case in which touch input of a user is detected, detects a point to which the touch point is moved in response to touch movement input of moving the touch point while the touch input of the user is maintained, selects a target upper item among candidate upper items of the upper layer menu in response to a case in which the touch point is moved to a point indicating the target upper item, detects a touch return movement input in which the touch point returns to the reference point after the target upper item is selected, and replaces the graphic object indicating the upper layer menu with a graphic object indicating a lower layer menu corresponding to the target upper item and outputs the replaced graphic object in response to a case in which the touch return movement input is detected.

12. A command menu outputting apparatus including a processor, wherein, in response to a case in which a manipulation detector detects touch input of a user at a reference point, the processor outputs a manipulation indicator at the reference point, indicating a touch point from which the touch input is detected,
    outputs an upper graphic object indicating an upper layer menu among the layered command menus on the display based on the manipulation indicator,
    detects a point to which the manipulation indicator is moved, in response to touch movement input of moving the touch input while the user touch input is maintained,
    selects a target upper item corresponding to the point to which the manipulation indicator is moved among candidate upper items of the upper layer menu, detecting a touch return movement input in which the touch point returns to the reference point after the target upper item is selected, replaces the upper graphic object with a lower graphic object indicating a lower layer menu corresponding to the target upper item, outputs the replaced lower graphic object in response to a case in which the touch return movement input is detected, selects a target lower item among candidate lower items of the lower layer menu depending on the touch movement input, detects a drop input of releasing the touch point from a point corresponding to one of We target lower item and the next lower layer item, and in response to a case in which the drop input is detected, executes an operation corresponding to one of the target lower item and the next lower layer item.

\* \* \* \* \*